United States Patent

[11] 3,587,320

| [72] | Inventors | Graham A. Ireland<br>Ottawa, Ontario; Canada<br>Douglas L. McNaughton, Almonte,<br>Ontario; Canada |
|---|---|---|
| [21] | Appl. No. | 839,490 |
| [22] | Filed | July 7, 1969 |
| [45] | Patented | June 28, 1971 |
| | | Assignor to Leigh Instruments Limited |

[54] ALTIMETER INDICATING MECHANISM INCORPORATING FLEXIBLE ROTARY COUPLING
5 Claims, 4 Drawing Figs.

[52] U.S. Cl. ............................................... 73/386
[51] Int. Cl. ............................................... G01l 7/12
[50] Field of Search ..................................... 73/386, 387, 393, 384

[56] References Cited
FOREIGN PATENTS
1,111,951  12/1955  France ........................ 73/386

*Primary Examiner*—Donald O. Woodiel
*Attorney*—Smart and Biggar

ABSTRACT: A flexible rotary coupling for circumferentially aligning two shafts while permitting circumferential displacement if the two shafts are independently driven, having coaxial cranks one on each shaft and coaxial spring-loaded crank alignment elements urging the cranks into circumferential alignment but permitting circumferential misalignment against the spring force.

An altimeter with permanent connection of a barometric input through a flexible rotary coupling to the indicating mechanism while permitting the indicating mechanism to be independently directly driven by an altitude computer input.

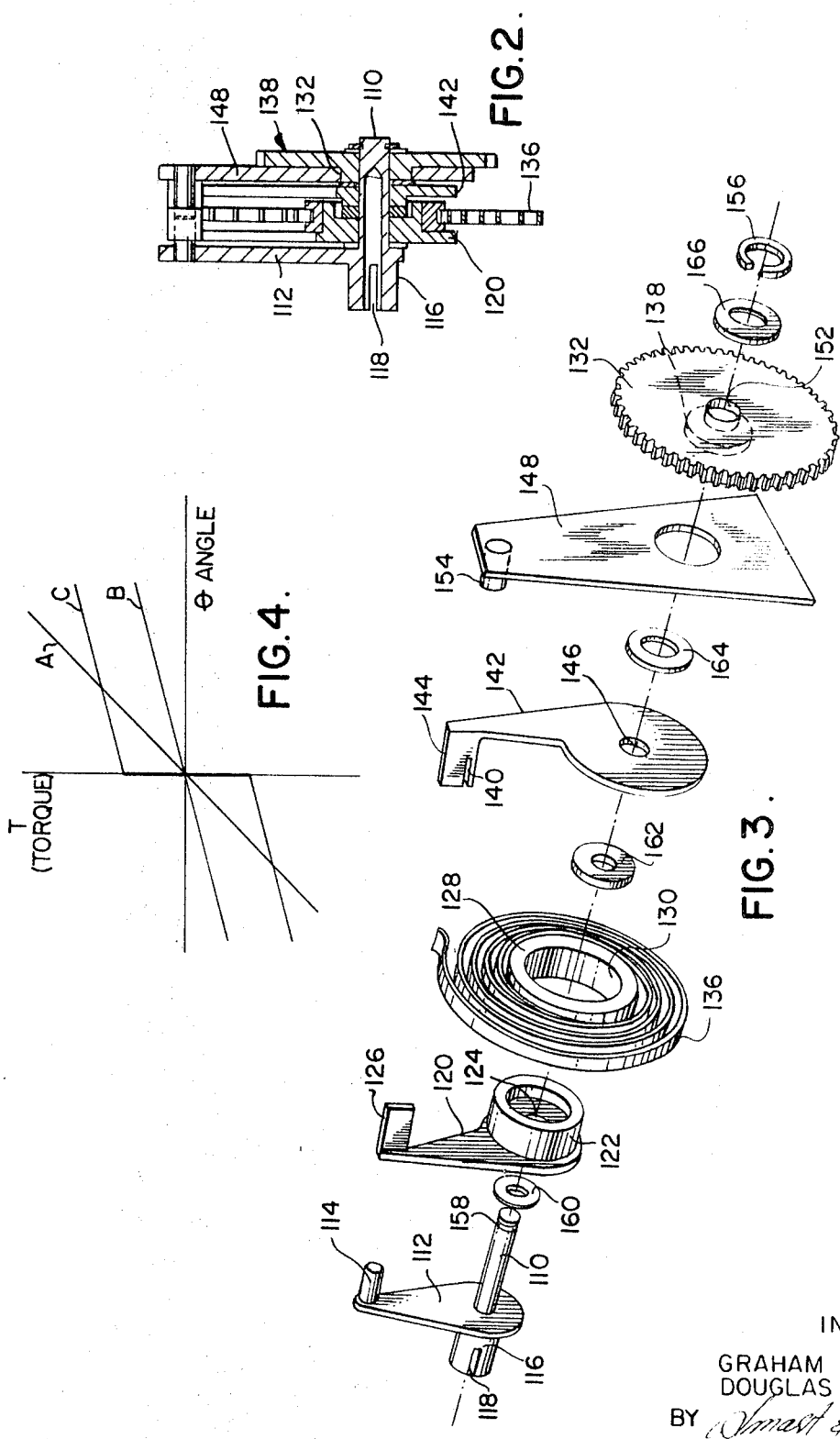

3,587,320

ALTIMETER INDICATING MECHANISM INCORPORATING FLEXIBLE ROTARY COUPLING

BACKGROUND OF THE INVENTION

The present invention relates to a flexible rotary coupling, particularly suitable for use in low torque, low friction applications in which accurate circumferential alignment of two shafts is required, and to an altimeter incorporating such flexible coupling.

In the design of aircraft altimeters, it is frequently required that the indicating mechanism of the altimeter respond either to an altitude computer input, or to an input obtained from an aneroid input, because of the possibility of failure of the altitude computer. Military specifications require that in both modes of operation, the aneroid input be permanently connected to the altimeter indicating mechanism without disengagement. On the other hand, the altitude computer input must be able to override the aneroid input, and this must be accomplished so that the connecting mechanism is not unduly stressed, and so that errors are not introduced into the displayed altitude reading when the computer mode is used.

One way to solve the above problem is to provide a flexible coupling between the barometric input and the altimeter indicating mechanism. Because the altitude computer might provide an altitude reading different from that provided by the barometric input, the difference could be taken up by the flexible coupling. However, it is also required in an altimeter or any other precise instrument, that when the overriding input (e.g., the altitude computer input) is removed, the indicating instrument input is precisely, or substantially precisely, that of the permanently connected input (e.g., the aneroid input), thus requiring precise circumferential alignment in the flexible coupling.

By "circumferential alignment" is meant alignment along a path defined by the periphery of a hypothetical circle having as its center the axis of rotation of the coupled elements. If the coupled elements are circumferentially aligned, then if one coupled element rotates through $x$ degrees, the other will also rotate through precisely $x$ degrees.

Flexible rotary couplings known prior to the present invention have been unsatisfactory, generally because they have not provided the required precise circumferential alignment. U.S. Pat. No. 3,280,242, issued to J. Brown on Oct. 18 1966, illustrates a spring-loaded coupling for use in the case where two shafts are axially misaligned but makes no provision for accurate circumferential alignment. U.S. Pat. No. 2,616,274, issued Nov. 4 1952, to P. Landrum, illustrates a flexible coupling for use as an energy-storing or impact-absorbing device, but also lacks provision for accurate circumferential alignment of the coupled elements. The projecting ends of the coil spring illustrated in the flexible coupling illustrated in U.S. Pat. No. 2,336,307, issued Dec. 7 1943, to E. A. Slye, at first glance appear to provide some provision for correct circumferential alignment, but upon closer inspection it can be observed that this flexible coupling, which was intended for use as a high-speed impact absorber, has inherent structural defects that militate against accurate circumferential alignment of the input and output sides of the flexible coupling. The projecting ends of the coil spring in the Slye device, in order to provide accurate circumferential alignment, must be substantially parallel, and in order to accomplish this, as well as for ease of manufacture, the preload in the Slye coil spring is substantially zero. But, since the preload on the coil spring is zero when the rotating elements are aligned, there will be substantially no force acting on the rotating elements engaging the projecting ends of the coil spring, and thus substantial departures from exact circumferential alignment will occur. Note that even, if the Slye coil spring were given an extra turn so that a preload force of greater than zero were obtained, the inner surfaces of the projecting extremities of the coil springs would tend to press tightly against the innermost alignment element which they engage, and thus the outer ends of the projecting extremities of the coil spring would tend to diverge under the force of the coil spring. This divergence of the outer ends of the extremities of the coil spring would permit the outermost of the two engaged alignment elements considerable free play, which would prevent the exact circumferential alignment required in high precision applications, such as aircraft altimeters. Furthermore, if the coil spring in the Slye patent were given some preload, the wear on the extremities of the coil spring would be very high at the points of contact of the inner ends of the projecting extremities of the coil spring with the innermost alignment device, causing high wear at these points of contact.

SUMMARY OF THE PRESENT INVENTION

The present invention resembles the Slye coupling in providing a rotary flexible coupling including a spring, but its structure affords the possibility of precise circumferential alignment of the coupled elements without encountering the disadvantages inherent in the Slye structure.

The present invention provides a flexible rotary coupling of the type having pivotable cranks and pivotable crank alignment elements on a common axis of rotation, spring means urging the crank alignment elements circumferentially towards one another and into contact with contacting means on each of the cranks, thereby urging the cranks, which are pivotable with respect to each other against the force of the spring means, into rotary alignment, characterized in that the crank alignment elements are each provided with a projecting tab which contacts the contacting means on both said cranks, the tabs and the contacting means being substantially equally radially displaced from the axis of rotation, and the spring means applying force to the crank alignment elements both when the cranks are aligned and when the cranks are misaligned. According to an embodiment of the present invention, an input and an output rotary means (e.g., a shaft), having a common axis of rotation, are each provided with a crank arm, each crank arm having a projecting rod displaced at a radial distance from the axis of rotation equal to the displacement of the rod on the other of the two crank arms from the axis of rotation. A pair of tab support arms are provided having the same axis of rotation as the crank arms, and each tab support arm is provided with a tab which engages both of the projecting rods on the crank arms. A hair spring is mounted about the axis of rotation, with one end connected to one of the tab support arms and the other end connected to the other of the tab support arms. The tabs are disposed circumferentially one on either side of the projecting arms so that they are displaced from one another circumferentially by an amount equal to the width of each of the projecting rods. The hair spring is under a light tension force, for example one extra revolution of the hair spring, so that the tabs bear against the projecting rods with a slight force (i.e., the tabs are preloaded). The result is that the projecting rods tend to be maintained in axial alignment by the force of the tabs against them, and the crank arms are thus maintained in circumferential alignment. However, circumferential misalignment is permitted, further slightly stressing the hair spring, in the event that the two shafts are separately driven.

SUMMARY OF THE DRAWINGS

FIG. 2 is a cross-sectional view of a coupling device constructed according to the present invention.

FIG. 3 is an exploded perspective view of the coupling device of FIG. 2.

FIG. 4 is a graph showing the torque characteristics of the coupling of FIG. 2.

DETAILED DESCRIPTION WITH REFERENCE TO THE DRAWING

Figure 1:
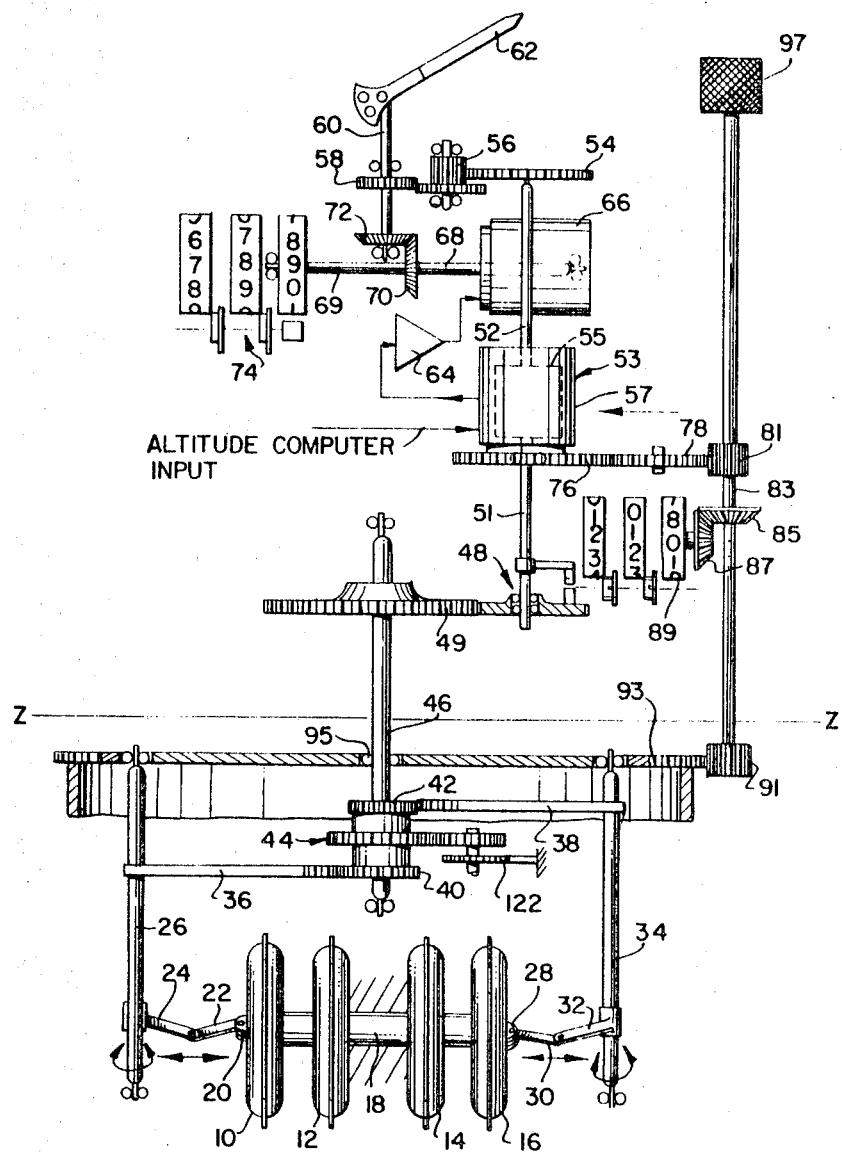
FIG. 1 illustrates a schematic diagram of an altimeter arrangement in which a flexible coupling according to the present invention may be used.

Referring to FIG. 1, aneroid capsules 10, 12 on the left-hand side and 14, 16 on the right-hand side, are mounted on a central mounting piece 18 which is fixed to the frame (not shown) of the altimeter. A pressure decrease results in expansion of the hub portions of the aneroid capsules and in the case of the left-hand pair of capsules 10, 12, is transmitted via hub connections (not shown) to a hub connecting post 20 which is pivotally attached to a link 22 which in turn is pivotally attached to a crank 24 fixed to a rotatably mounted shaft 26. Corresponding elements 28, 30, 32 and 34 are shown connected to the right-hand pair of aneroid capsules 14, 16. Because altitude is not linearly related to pressure variation, the linkage 22, 24 and 28, 32 is nonlinear in accordance with conventional altimeter design.

For purposes of explanation of the schematic diagram of FIG. 1, the connecting post 20 is shown as extending to the left of the outermost capsule 10 but in fact may be located between the capsules 10 and 12 internally of the capsule hubs. The same is true of post 28.

The inward or outward motion of the post 20, caused by contraction or expansion of the aneroid capsules 10, 12 is converted by link 22 and crank 24 to pivotal motion of the shaft 26. The shaft 26 is rigidly connected to a quadrant gear 36 of conventional design, and similarly the right-hand shaft 34 is connected to a quadrant gear 38. The quadrant gears 36, 38, drive pinions 40 and 42 respectively, each of which constitutes an input to a differential gear assembly 44. The differential assembly is preferably of the type described in a copending application entitled "Differential Output for Barometric Instrucment" (Graham A. Ireland et al.) filed on the same day as the present application. The output of the differential gear assembly is transmitted to an output shaft 46 and gear 50, which drives a spring-loaded coupling (drawn in simplified form) generally designed as 48 and which will be described in detail below with reference to FIGS. 2 and 3. The spring-loaded coupling 48 in turn drives a shaft 51 through the rotor 55 of synchrocontrol transformer 53 to shaft 52 (an extension of shaft 51) and thence to rotary gears 54, 56 and 58 to an output indicator shaft 60 to which is attached an indicating pointer 62. The shaft 60 through level gears 70, 72 drives shaft 68 and Veeder type counter 74. Pointer 62 and counter 74 indicate the altitude reading.

For the purposes of the schematic drawing, pointer 62 and mechanical linkage elements 20, 22, 24, 28, 30 and 32 are shown in plane and perspective although the other elements are shown in elevation view.

In accordance with modern practice, altitude readings may also be obtained form altitude computing apparatus (not shown) whose output is applied via control transformer 53 and operational amplifier 64 to a servomotor 66 which also drives shaft 68. Thus, the altitude reading may come either from the servo input via motor and shaft 68 or from the barometric input via shaft 52. In order that the mechanism function satisfactorily in case the two inputs are not identical, as will often happen, the flexible coupling 48 absorbs the discrepancy in input without unduly stressing any portion of the mechanical system. The structure and operation of the coupling will be described further below with reference to FIGS. 2 and 3.

The outer casing 57 of the synchrocontrol transformer is rotatable and may be turned annular gear 76 fixed to the outer periphery of the synchrocontrol transformer 53.

Annular gear 76 is driven via idler 78 by pinion 81 mounted on shaft 83. Also mounted on shaft 83 is bevel gear 85 and pinion 91. The bevel gear 85 drives meshing level gear 87 which in turn drives barometric counter assembly 89, which is preferably of the type described in a copending application entitled "nonlinear Counter" filed on the same day as the present application, in the name of J. R. B. Steacie. Shaft 83 may be turned manually by a knob 97 attached to one end of the shaft 83.

The entire casing for the barometric portion of the unit terminates in an uppermost plate 93 whose outer periphery is toothed to mesh with pinion 91. Bearings 95 interposed between shaft 46 and the plate 93 permit the entire barometric assembly to rotate about the shaft 46 as the knob 97 is turned. Turning the knob 97 also has the effect of rotating the annular gear 76 and thus the outer casing of the synchrocontrol transformer 53.

The purpose of having the manually adjustable knob 97 and the mechanism associated immediately therewith is to permit the operator of the instrument to set the counter 89 to a specified datum pressure, to take into account the prevailing barometric pressure. According to conventional specifications, the altitude computer will be designed to an assumed barometric pressure of 29.92 inches of mercury. The operator of the altimeter, an aircraft pilot, will have to be able to adjust the instrument to some other barometric pressure for the purpose of landing and taking off, because it is essential that the instrument give correct altitude reading according to actual prevailing conditions and not fictitious reading based on an assumed prevailing pressure, at the critical landing and takeoff times. The details of the structure and operation of the barometric setting mechanism are not a part of the present invention.

Referring now to the design details of the coupling 48 as illustrated in FIGS. 2 and 3, the shaft 110 of the coupling on which the other elements of the coupling are pivotally mounted, is connected to crank 112 having at its extremity axially extending projecting rod 114. The shape of element 112 is of course arbitrary; rod 114 could equally well be mounted in a gear wheel. On the other side of the crank arm 112 is shaft extension 116, having a slot 118, to which a pinion, etc. (not shown) may be fixed. A tab support arm 120 is provided with a hub 122 having a circular opening 124 for free rotation on shaft 110. At the outer extremity of the tab support arm 120 is a tab 126 radially displaced from the hole 124 by substantially the same amount as the projecting rod 114 is displaced from shaft 110, so that the tab support arm 120 is not able to make a complete revolution about the shaft 110, but is prevented from doing so because of the abutment of tab 126 against the projecting rod 114.

A hair spring support hub 128 is provided with a central, generally circular aperture 130 of nearly the same diameter as that of the external diameter of hub 122, so as to provide a tight friction fit of hub 128 on hub 122. Alternatively, a slot and key arrangement could be used to prevent rotation of hub 128 with respect to hub 122. A hair spring 136 is mounted about hub 128, with the inner end fixed to the hub 128 (alternatively, it could be provided with a projecting end engaging a slot in the tab support arm 120), and the outer end of the spring engaging a slot 140 in tab 144 of the tab support arm 142, rotatably mounted on shaft 110. The hair spring 136 is under light tension; it may be given on extra turn beyond unstressed condition, for example. Tab support arm 142, apart from the presence of slot 140 and the absence of hub 122, is otherwise a mirror image of tab support arm 120, projecting tab 144 being spaced a radial distance from aperture 146 equal to the spacing of tab 126 from aperture 124.

Finally, crank arm 148 fits tightly on hub 132 of gear 138, which rotates freely about shaft 110, the opening 152 in hub 132 being of slightly greater diameter than that of shaft 110. A projecting rod 154 is spaced from opening 152 by a radial distance equal to the spacing of tab 144 from aperture 146. Clip ring 156, engaging recess 158 on the shaft 110, holds the assembly together and prevents the tab support arms 120, 142, and crank arms 112, 148 from sliding off shaft 110. Spacers 160, 162, 164 and 166 keep the various elements of the assembly properly spaced.

The dimensions of the two tabs 126 and 144, of the projecting rods 114, 154, and the axial thickness of the elements mounted on shaft 110 are chosen so that the tabs 126, 144 each strike both projecting rods 114, 154, but the projecting rods 114, 154 do not extend far enough to touch one another. Thus, in the embodiment illustrated, projecting rods 114, 154 are of uniform dimensions and their cylindrical axis is parallel to the axis of rotation, while tabs 126, 144 are about twice as long, in an axial direction, as either of the rods 114, 154. The surface of tabs 126, 144 which contact the rods 114, 154 are substantially parallel to the axis of rotation and are generally radially disposed.

Either the shaft 110 or the gear 138 may serve as an input and the other as an output. In the application of the unit to an altimeter arrangement as illustrated in FIG. 1, one of the two possible inputs, say gear 138, is driven by the aneroid unit, and therefore the crank arm 148 will always have a specific angular position depending upon the pressure applied to the aneroid capsules. If the crank arm 112 is free to move and is not driven by the servomotor 66, then the projecting rod 114 will be constrained to align itself with rod 154 and the crank 112 constrained to follow the motion of the crank 148, because tabs 126 and 144 will be forced by the hair spring 136 into contact with, one on either side of, the two rods 114, 154. In such a case, the altimeter output reading will be that determined by the aneroid capsules. If however, the indicating mechanism of the altimeter is driven by the altitude computer, the shaft 110 will now be positively driven and thus the crank 112 will take a circumferential position independent of, and frequently slightly different from, the circumferential position of the crank arm 148. This is possible because the displacement in a clockwise direction of the projecting rod 114 will force the tab 126 to move clockwise against the force of the hair spring 136, whilst counterclockwise displacement of the projecting rod 114 simply results in a corresponding counterclockwise displacement of the projecting tab 144 against the force of the hair spring 136. However, once the altitude computer input is turned off, leaving the crank arm 126 again free to rotate, the force of the hair spring 136 against the tab support arms 120 and 142 will force the projecting rod 114 to become aligned again with the projecting rod 154. Thus, the altimeter can be driven either in the barometric mode or the computer mode without unduly stressing the mechanical system in any way. The entire stress is taken up by the hair spring 136, which can be made relatively weak.

Obviously the use of the coupling is limited to operations in which the angular displacement of the crank arm 148 will be less than a full revolution from the displacement of the crank arm 114. In an actually constructed prototype of the altimeter described by way of example, such differences in displacement are usually small. A difference in altitude of 10,000 feet, which would be about the largest difference over expected between aneroid and computer readings, would involve an angular displacement of crank 112 from crank 148 of about 180°. An automatic switch (not shown) can switch off the motor if the angular difference exceeds, say 300°, which would indicate that there was something wrong with the instrument.

In designing the flexible coupling for use in the altimeter, two opposing considerations must be weighed. First, the spring force should be relatively weak, and substantially constant, so that the force applied to the aneroid portion of the instrument is not too great when the altimeter is driven in the computer mode, and so that the motor 66 will be able to drive the indicating mechanism without introducing excessive errors into the displayed altitude reading. Second, the spring force should be strong enough that accurate alignment of the two projecting rods on the two crank arms is maintained in aneroid mode of operation. The spring force must be at least great enough to overcome the forces of friction encountered in the indicating mechanism, etc. which resist circumferential alignment of the two crank arms.

FIG. 4 illustrates spring torque relationships, plotting torque T applied by the spring against angle θ of misalignment. Curve A shows the torque-angle relationship for an impact-absorbing coil spring of the type disclosed in the aforesaid Slye U.S. Pat. No. 2,336,307. Curve B shows the torque-angle relationship of a much weaker spring, of the type suitable for rotary alignment in precision instruments. Curve C, exemplary of the characteristic curve of a coupling according to the present invention, shows the result of incorporating the spring having the curve B characteristic into the coupling of FIG. 2. By preloading the spring, e.g., by giving it a single extra turn, torque at alignment (0° misalignment) is either positive or negative (depending upon the direction of the forces tending to cause misalignment but is not zero (as is the case with the Slye coil spring). Curve C also indicates that the torque applied changes only slightly with increasing angle of misalignment in either direction, in contrast to the Slye spring characteristic.

In a prototype altimeter constructed, it was found that the maximum friction load encountered when the altitude computer was not operating, was about 0.008 inch-ounces. Accordingly, in order to ensure that the two tabs force the projecting rods into rotational alignment the spring load torque had to be greater than 0.008 inch-ounces. A spring torque of 0.016 inch-ounces at 0° misalignment, increasing to 0.024 inch-ounces at 180° misalignment was found satisfactory. This was made available by a stainless steel spring 0.003 inches thick and 0.030 inches wide, 11.6 inches long, and having nine turns in unstressed condition, with one extra turn to provide the preloading required to give the required torque.

The servomotor must, of course, be able to provide sufficient torque to turn the indicating mechanism, despite the force applied by the hair spring. In the prototype altimeter constructed, the motor torque available was 0.033 inch-ounces at its output shaft, which translated into 0.33 inch-ounces, by means of an appropriate gear train, at the shaft of the coil spring coupling. This is considerably greater than the 0.016 inch-ounces of spring torque, and therefore no problem was encountered in driving the altimeter indicating mechanism in the computer mode of operation.

We claim:

1. An altimeter having an indicating mechanism having:
   a. rotary input means,
   b. a first source of altitude information in the form of a first rotary output,
   c. a flexible rotary coupling comprising a first and a second circumferentially rigid crank, a first and a second circumferentially rigid tab support arm, said cranks and tab support arms being rotatably mounted about a common axis of rotation, a tab on each said tab support arm each having a surface parallel to the axis of rotation, said surface being equally radially displaced from the axis of rotation, tab contacting means on each radially displaced from the axis of rotation by an amount equal to the radial displacement of the said surfaces from the axis of rotation, spring means urging said tabs towards one another both when the cranks are aligned and when the cranks are misaligned, the spring means urging each of said surfaces in a substantially circumferential direction to contact both said tab engaging means thereby urging the cranks into circumferential alignment, said cranks being pivotable with respect to one another and capable of circumferential misalignment under a force greater than the provided by the spring means;
   d. said first rigid crank connected to and driven by said first rotary output and said second rigid crank connected in driving relationship to said rotary input means of the indicating mechanism; and
   e. means for selectively providing a second source of altitude information as a second rotary output directly connected in driving relationship to the rotary input means of the indicating mechanism, whereby difference between the altitude information provided by the first source and by the second source are mechanically absorbed in the coupling by the circumferential displacement of one of the cranks relative to the other of the cranks.

2. An altimeter as defined in claim 1 wherein the torque provided by the second rotary output to the crank to which it is connected is higher than the torque provided by the spring means applied to said last-mentioned crank.

3. An altimeter as defined in claim 2, wherein the torque provided by the spring means is higher than the torque provided by forces resisting the circumferential movement of the said surfaces of the tab support arms into contact with the tab engaging means, in the absence of torque applied by the second rotary output.

4. An altimeter as defined in claim 3, wherein the first source of altitude information is a aneroid device.

5. An altimeter as defined in claim 4, wherein the second source of altitude information is a servomotor driven by an altitude computer.